US012700133B2

(12) United States Patent
Besbes

(10) Patent No.: US 12,700,133 B2
(45) Date of Patent: Aug. 4, 2026

(54) METHOD FOR SELECTING SURFACE POINTS FROM A CAD MODEL FOR LOCATING INDUSTRIAL 3D OBJECTS, APPLICATION OF THIS METHOD TO THE LOCATION OF INDUSTRIAL 3D OBJECTS, AND AUGMENTED REALITY SYSTEM USING 3D OBJECTS THUS LOCATED

(71) Applicant: Dassault Systèmes, Vélizy-Villacoublay (FR)

(72) Inventor: Bassem Besbes, Palaiseau (FR)

(73) Assignee: Dassault Systèmes, Vélizy-Villacoublay (FR)

( * ) Notice: Subject to any disclaimer, the term of this patent is extended or adjusted under 35 U.S.C. 154(b) by 852 days.

(21) Appl. No.: 17/757,751

(22) PCT Filed: Dec. 18, 2020

(86) PCT No.: PCT/FR2020/052540
§ 371 (c)(1),
(2) Date: Mar. 16, 2023

(87) PCT Pub. No.: WO2021/123671
PCT Pub. Date: Jun. 24, 2021

(65) Prior Publication Data
US 2023/0298203 A1 Sep. 21, 2023

(30) Foreign Application Priority Data
Dec. 18, 2019 (FR) ...................................... 1914696

(51) Int. Cl.
*G06T 7/73* (2017.01)
*G06T 7/80* (2017.01)

(52) U.S. Cl.
CPC .................. *G06T 7/74* (2017.01); *G06T 7/75* (2017.01); *G06T 7/80* (2017.01);
(Continued)

(58) Field of Classification Search
CPC .... G06T 7/74; G06T 7/75; G06T 7/80; G06T 2207/20021; G06T 2207/20081;
(Continued)

(56) References Cited

U.S. PATENT DOCUMENTS

2014/0085429 A1 3/2014 Hébert et al.
2018/0348854 A1 12/2018 Powers et al.
(Continued)

FOREIGN PATENT DOCUMENTS

CN 103635937 A 3/2014
WO 2019/013736 A1 1/2019

OTHER PUBLICATIONS

Damen, D et al., "Real-time learning and detection of 3D texture-less objects: A scalable approach," 2012. British machine vision conference. BMVA, pp. 23-1 (Year: 2012).*
(Continued)

*Primary Examiner* — Ming Y Hon
*Assistant Examiner* — Dominique James
(74) *Attorney, Agent, or Firm* — TraskBritt

(57) ABSTRACT

A method for automatically selecting 3D points from a CAD model, for 3D locating of an industrial object, comprises the following steps: generating a geometric model from the CAD model; previously designating reference viewpoints from a priori knowledge of the current viewpoints of the camera; acquiring, by way of a camera, a plurality of images taken from viewpoints of interest of the object; associating each acquired image with a reference viewpoint in order to form sub-sets of images (partitions) and identifying a reference image for each partition; and selecting n 3D surface points for each partition. The method may be used, in particular, for locating industrial 3D objects, in augmented reality equipment.

12 Claims, 5 Drawing Sheets

(52) U.S. Cl.
CPC .............. *G06T 2207/20021* (2013.01); *G06T 2207/20081* (2013.01); *G06T 2207/20084* (2013.01); *G06T 2207/30108* (2013.01)

(58) Field of Classification Search
CPC . G06T 2207/20084; G06T 2207/30108; G06T 2207/30164

See application file for complete search history.

(56) References Cited

U.S. PATENT DOCUMENTS

2020/0380723 A1* 12/2020 Mukherjee .............. G06T 7/251
2022/0101639 A1*  3/2022 Shugurov ................ G06N 3/08

OTHER PUBLICATIONS

Han, P et al., "CAD-based 3D objects recognition in monocular images for mobile augmented reality," 2015, Computers & Graphics 50: 36-46 (Year: 2015).*

International Search Report for International Application No. PCT/FR2020/052540 dated Apr. 19, 2021, 3 pages.

International Written Opinion for International Application No. PCT/FR2020/052540 dated Apr. 19, 2021, 4 pages.

Chinese First Office Action and Search Report for Application No. 202080094429.5 dated Dec. 9, 2025, 6 pages.

Eade et al., Edge Landmarks in Monocular SLAM, Image and Vision Computing, vol. 27, (2009), pp. 588-596.

Loesch et al., Localization of 3D Objects Using Model-Constrained SLAM, Machine Vision and Applications, vol. 29, (2018), pp. 1041-1068.

Wu et al., Detection and Tracking of Multiple, Partially Occluded Humans by Bayesian Combination of Edgelet Based Part Detectors, International Journal of Computer Vision, vol. 75, No. 2, (2007), pp. 247-266.

Zhao et al., Estimating 6D Pose From Localizing Designated Surface Keypoints, (arXiv: 1812.01387v1 [cs.CV] 4, Dec. 2018, 9 pages.

Zhongren et al., Visual Recognition and Localization Method for Randomly PlacedModel, Infraraed Laser and Engineering, vol. 44, No. S, 13 pages with machine translation.

* cited by examiner

METHOD FOR SELECTING SURFACE POINTS FROM A CAD MODEL FOR LOCATING INDUSTRIAL 3D OBJECTS, APPLICATION OF THIS METHOD TO THE LOCATION OF INDUSTRIAL 3D OBJECTS, AND AUGMENTED REALITY SYSTEM USING 3D OBJECTS THUS LOCATED

CROSS-REFERENCE TO RELATED APPLICATIONS

This application is a national phase entry under 35 U.S.C. § 371 of International Patent Application PCT/FR2020/052540, filed Dec. 18, 2020, designating the United States of America and published as International Patent Publication WO 2021/123671 A1 on Jun. 24, 2021, which claims the benefit under Article 8 of the Patent Cooperation Treaty to French Patent Application Serial No. FR1914696, filed Dec. 18, 2019.

TECHNICAL FIELD

The present disclosure relates to a method for selecting surface points from a CAD model for locating industrial 3D objects. It also targets the application of this method to the location of industrial 3D objects as well as an augmented reality system exploiting 3D objects thus located.

The field of the present disclosure is that of, in particular, augmented reality solutions, in particular, for aiding the mounting and assembly of industrial parts.

BACKGROUND

Computer viewing and machine learning techniques already exist that are applied to images acquired by an RGB monocular viewing system. These techniques are both inexpensive and easy to implement because they do not rely on the use of multi-sensors or 3D sensors. Furthermore, they do not require instrumentalizing the scene of interest and equipping it with sensors, beacons or markers.

However, implementation difficulties are encountered when the camera used is completely mobile, in the presence of highly reflective and poorly textured objects and in highly variable lighting conditions. This is, in particular, the case in industrial environments for which the backgrounds of the scenes of interest can vary greatly, whereas millimetric location precision is sought.

A learning-based 6D location system is expected to have the ability to estimate the camera pose relative to a known object regardless of the background, position, and orientation of the object and the camera in all lighting conditions.

One existing approach to meet this expectation implements the concept of BOF ("Bag of Features") representation, which involves a step of extracting local features.

A first phase, called learning, is carried out offline to establish a representation model. A second phase, called the test phase, is carried out online and allows the 3D location of the object.

During the first phase, local descriptors are extracted from the set of training images to build a "bag of visual words," commonly referred to by the acronym BOF (Bag Of Features). These descriptors are extracted from areas of interest located in the image region where the object is present. The local descriptors are indeed 2D observations of 3D points that are reconstructed by triangulation or by the back-projection of 2D points on the surface of the CAD model.

During the second phase, the steps of feature extraction and matching with the "bag of visual words," object recognition, and 6D pose estimation by 2D/3D matching are successively carried out.

This approach allowing object recognition, and also estimating the camera pose, however, has the drawback of only working well if the context changes little. It is not robust against large changes in the appearance of the object. Failure may even occur if the object is not very textured or is very reflective because not only the zones of interest change, but also the local descriptors.

Over the past ten years, the concomitance of computational capabilities and key theoretical advances has enabled the emergence of techniques based on deep learning using CNN (Convolutional Neural Network) models. This second CNN-based approach comprises a first convolutional part functioning as an automatic extractor of the most relevant features according to the training data.

The second part of CNN comprises optimizing the network coefficients to minimize the output classification error. The two parts of the CNNs are trained simultaneously: both the coefficients of the convolution kernels to extract relevant features, and the right combination of these features are learned.

Two main categories of CNN-based methods should be distinguished. Methods that view the 6D pose estimation problem as a pose classification or regression problem. These methods are not able to provide a very precise pose estimation. The methods of the second category are based on an intermediate representation. In order to obtain greater precision, these methods are based on locating the projection of the 3D points in the images. From the 3D coordinates of these points, a pose can be calculated easily by associating 2D-3D data.

The article "Estimating 6D Pose From Localizing Designated Surface Keypoints" by Zelin Zhao et al. (arXiv: 1812.01387vl [cs.CV] Dec. 4, 2018) discloses a technique for estimating the 6D pose from an RGB image, in which a set of surface points is designated that correspond to areas of interest detected in the images as keypoints, a keypoint detector (KPD) is trained to locate them, then a PnP-type algorithm is performed that calculates the 6D pose based on the 2D data.

The article by Zelin Zhao et al. does not address the problem of selecting the most relevant surface points. The step of selecting these points is crucial to overcoming the limitations of use in highly variable background and lighting conditions, which is often the case in an industrial environment.

The object of the present disclosure is to propose a method for selecting surface points that can be used in an industrial environment and that makes it possible to carry out exhaustive learning having a power of generalization beyond the learning data.

BRIEF SUMMARY

This objective is achieved with a method for automatically selecting 3D points from a CAD model, for 3D locating of an industrial object, comprising the following steps:

- generating a geometric model from the CAD model, comprising a sampling of a set of 3D points extracted from straight edges of the CAD model, so as to generate 3D surface points,
- previously designating reference viewpoints from a priori knowledge of the current viewpoints of the camera, acquiring, by way of a camera, a plurality of images taken from viewpoints of interest of the object, associating each acquired image with a reference viewpoint to form sub-sets of images (partitions) and identifying a reference image for each partition, and selecting n 3D surface points for each partition, comprising the following steps:

refining the camera poses using the geometric model and identifying the associations of 3D surface points with 2D contour points that correspond to the refined poses, calculating a score for each 3D surface point based on the number of times that 3D surface point is a match contour point, projecting and grouping the 3D surface points in each reference image, and selecting the n 3D surface points having the best score for each of the partitions.

To perform a 3D location of an object filmed by a camera, the six degrees of freedom of the camera pose with respect to this object are measured.

When the selection method according to the present disclosure is implemented in a location according to the six degrees of freedom based on a convolutional neural network, it can also advantageously comprise the steps of:

training a first convolutional neural network to recognize a viewpoint of interest of the object among a set of reference viewpoints; and for each partition, learning heat maps corresponding to the 2D projections of the selected 3D surface points.

The selection method according to the present disclosure may further comprise a step of identifying, by the first convolutional neural network, the closest viewpoint among six predefined viewpoints calculated automatically according to a 3D bounding box of the 3D object and camera calibration settings.

This selection method may further comprise a partitioning sequence comprising the following steps:

annotating images for each learning sequence by launching 3D tracking, associating the nearest reference viewpoint with each image based on 2D projections of 3D surface points and/or visibility tests, and identifying p reference images acquired from the viewpoint closest to p reference viewpoints, thus producing p partitions of the acquired images.

The selection method according to the present disclosure may further comprise a step of associating a partition with each image for the purpose of teaching a multi-class detector, as well as a learning sequence during which:

a multi-class detector is taught, allowing detection of the industrial object and prediction of its distribution, and for each distribution, a keypoint detector is trained based on the location of heat maps.

It is important to note that all the steps of the selection method according to the present disclosure can be implemented by one or more computers executing one or more software applications implementing these steps.

According to another aspect of the present disclosure, an application of the selection method according to the present disclosure is proposed for locating an industrial 3D object, a geometric model of which is generated offline, comprising the following steps:

validating and refining a pose using the geometric model, this step being subject to prior initialization, generating a 3D location of the object, constructing an appearance model of the object.

In another application of the selection method according to the present disclosure, the latter can also comprise the following steps carried out online:

constructing an appearance model from the pose thus refined, extracting features in the following frames and matching with the appearance model, estimating a pose for the 3D object, and determining a confidence score for the pose estimate.

The pose estimation step can be followed by a step that is conditioned by the level of the confidence score as follows:

for a confidence score lower than a first predetermined threshold value, performing a 3D relocation based on a set of appearance models already produced, for a confidence score between the first threshold value and a predetermined value, refining, then validating the pose using the geometric model, and for a confidence score greater than the second predetermined value, confirming the 3D location.

The success or failure of the 3D relocation step can further lead respectively either to a new construction of an appearance model and a 3D location of the object, or to a reinitialization of the pose validation and refinement step.

The initialization or reinitialization step prior to the execution of the pose validation and refinement step can also implement an initialization module based on a convolutional neural network architecture.

According to yet another aspect of the present disclosure, an augmented reality system is proposed exploiting 3D objects located by implementing the method for selecting surface points according to the present disclosure.

The industrial object locating tool thus obtained can be implemented to optimize the overall performance of processes with high human complexity, by providing digital assistance to guide operations in the field and capture reality on the ground. This makes it possible to optimize the execution, monitoring and engineering of production, control and maintenance processes.

This operation tool with digital assistance makes it possible to process industrial 3D objects from an engineering design office to a workshop and vice versa. In this workshop, the tool makes it possible to assist an operator in the field in complex tasks and to collect field data and control results that are then used in the design office for optimization purposes. Digital data is then transferred through the tool, such as 3D models, work instructions and contextualized information.

Definitions

CNN:

CNN means a convolutional neural network.

Edgelets (3D Surface Points):

Edgelets are 3D points extracted from the straight edges of the 3D model. Each edgelet has the 3D orientation of the straight edge from which it was extracted. Edgelets are points that can give contour points in 2D images of the real object.

Heat Map:

A heat map is a graphical representation of statistical data that maps the intensity of a variable quantity to a range of tones or a color chart on a two-dimensional matrix. The heat map CNN prediction technique captures local and global features to build accurate KPDs.

Key Point Detector (KPD):

Software module allowing the location of 2D points by predicting their heat maps.

Match Contour Point:

The 3D surface points (edgelets) that are projected from the camera pose and that correspond to contour points in the images are considered here to be match contour points.

Appearance Model:

An appearance model is an image representation characterized by a set of local appearance descriptors.

Geometric Model:

A geometric model is generated directly from the CAD of the object. It is characterized by a set of 3D surface points oriented in 3D.

PnP:

PnP stands for "Perspective-n-Point" and relates to algorithms for estimating the pose of a calibrated camera from a set of n 3D points in the world and their corresponding 2D projections in the image.

DETAILED DESCRIPTION

Figure 1:
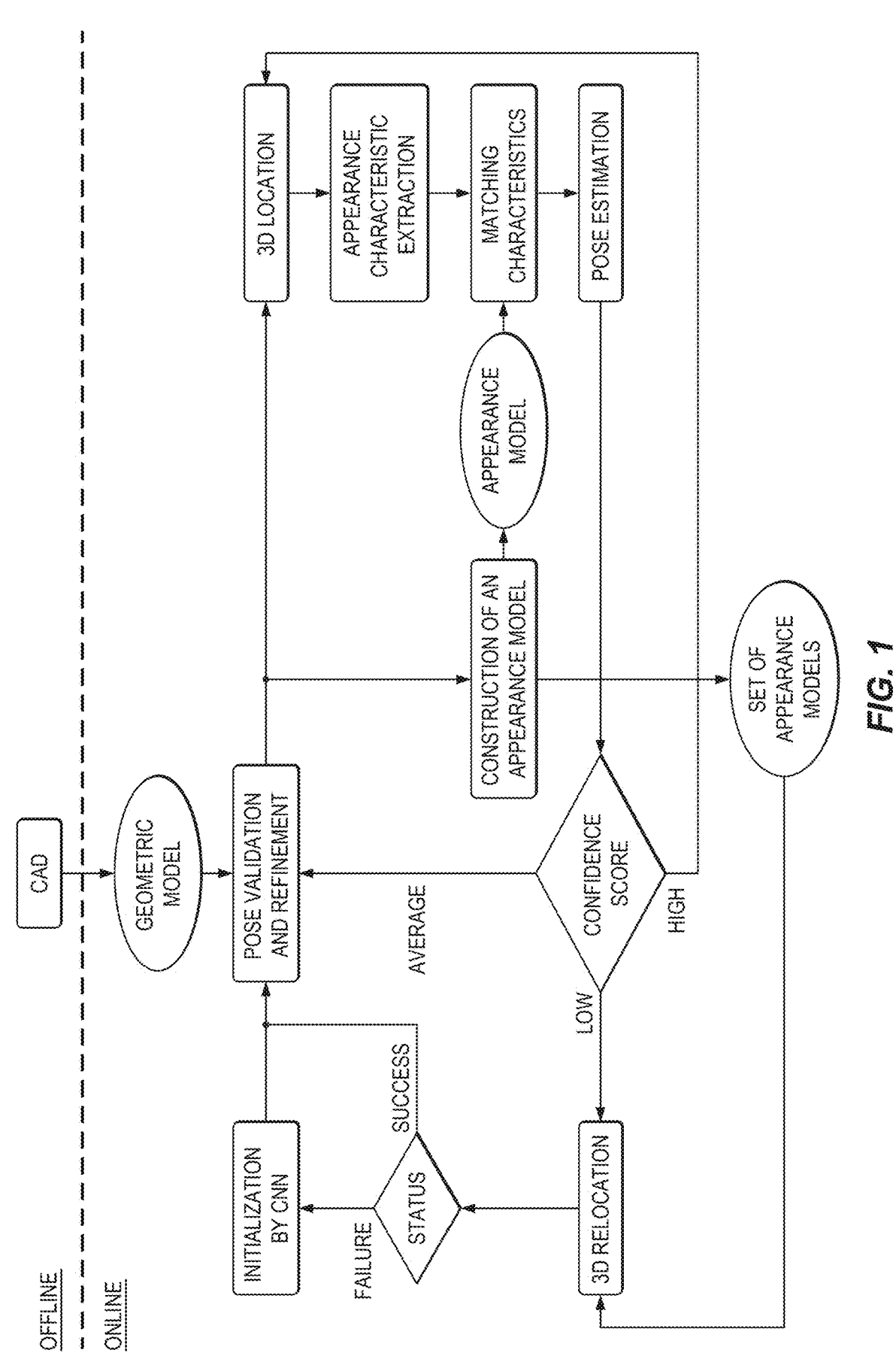
FIG. 1 is a block diagram of an embodiment of the 3D locating method according to the present disclosure.

Referring to FIG. 1, a geometric model is generated from the CAD. This model is used to refine, then validate, the pose of the camera that films the real object. From this step, an appearance model is constructed and a 3D location is carried out.

By way of non-limiting example, the refinement may comprise optimizing the pose of the camera with a view to maximizing the number of matches between 2D points and 3D points. The camera pose is validated as soon as there is a match ratio greater than a predetermined threshold, for example, 50% of the 3D points visible from the camera's viewpoint.

For subsequent images, appearance features are extracted, and then feature matching is performed based on the last appearance model that was constructed. This matching is followed by a pose estimation.

If the pose estimation leads to a high confidence score, the 3D location step is performed again.

By way of non-limiting example, the confidence score can be determined as being a score for matching 2D features between the last appearance model and the image being processed. This score can be calculated as the ratio of the number of primitives matched to the total number of primitives detected.

If the pose estimation leads to an average confidence score, the step of refining, then validating the pose is carried out and a new appearance model is generated.

If the pose estimation leads to a low confidence score, a 3D relocation is performed based on all the appearance models.

If this 3D relocation fails, the CNN-based module is used to estimate a pose, then the pose refinement and validation step is performed.

Figure 2:
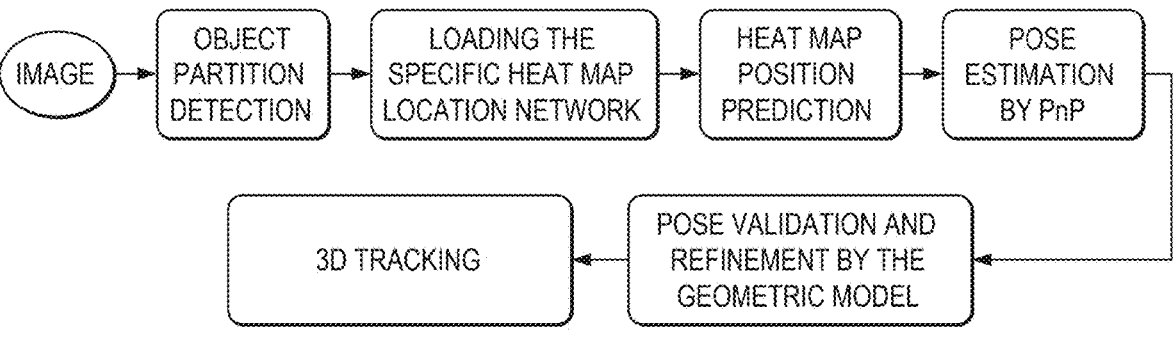
FIG. 2 is a block diagram of a 3D tracking operation implementing the methods for selecting surface points and 3D location.

If the relocation succeeds, an appearance model is constructed again. Referring to FIG. 2, the CNN inference method implemented in the point selection method according to the present disclosure comprises detecting the partition of an object in an image, followed by a step of loading the specific network for heat map location. The position of the heat maps is predicted, followed by PnP pose estimation. This is followed by a step of refining and validating the pose by the geometric model, which leads to 3D tracking.

Figure 3:
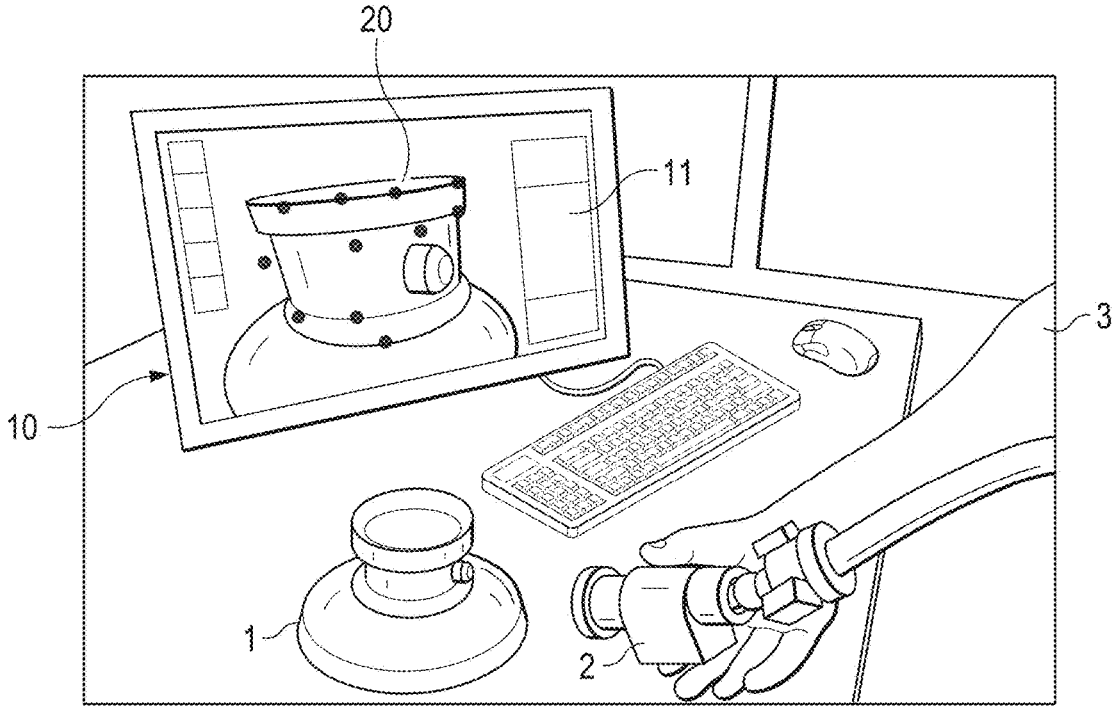
FIG. 3 illustrates a first embodiment of the surface point selection method according to the present disclosure for taking poses, applied to an industrial aeronautical part.

In a practical embodiment illustrated by FIG. 3, an industrial 3D object locating system according to the present disclosure is implemented in a workstation 10 with a view to locating an industrial part 1.

In "offline" mode, an operator 3 has placed one or more mobile cameras 2 in order to take a set of views of the part 1. A 3D representation of the part 1 appears on the screen 11 of the workstation 10 from the CAD model, and on this representation, there is a set of surface points 20 that have been selected on straight edges of the part 1. These selected surface points will be used later to locate the 3D part in augmented reality equipment worn by an operator in the field whose mission is to intervene on an industrial part of the type that has been processed by the selection method according to the present disclosure.

Figure 4:
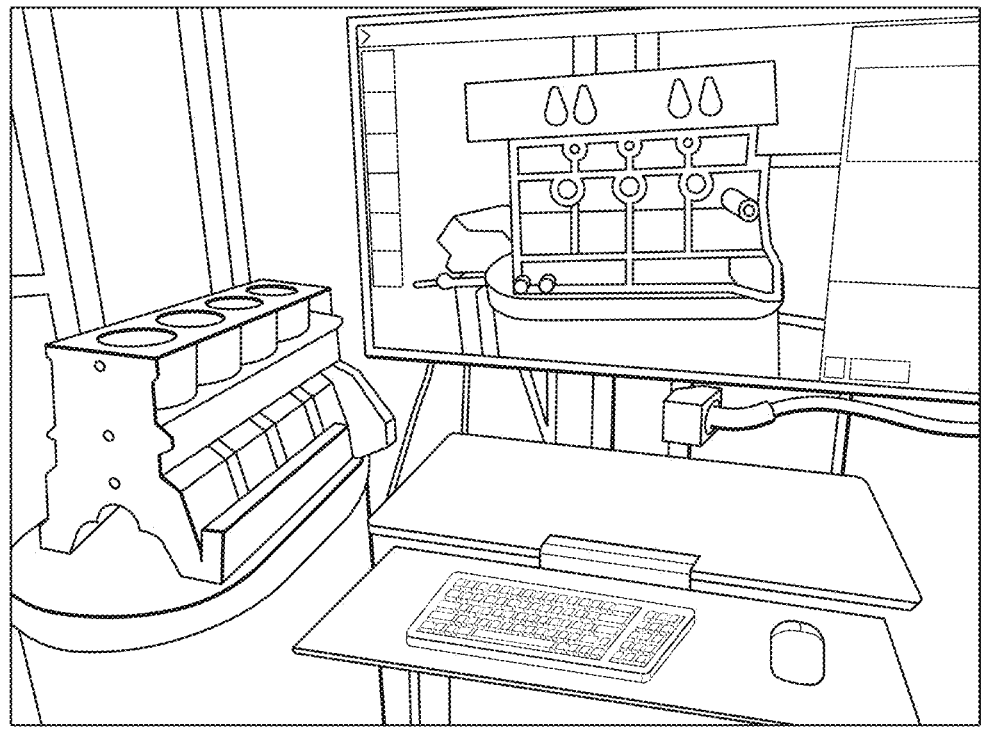
FIG. 4 illustrates a second example of sequences for implementing the surface point selection method according to the present disclosure for taking poses, applied to an automobile hood.
Figure 5:
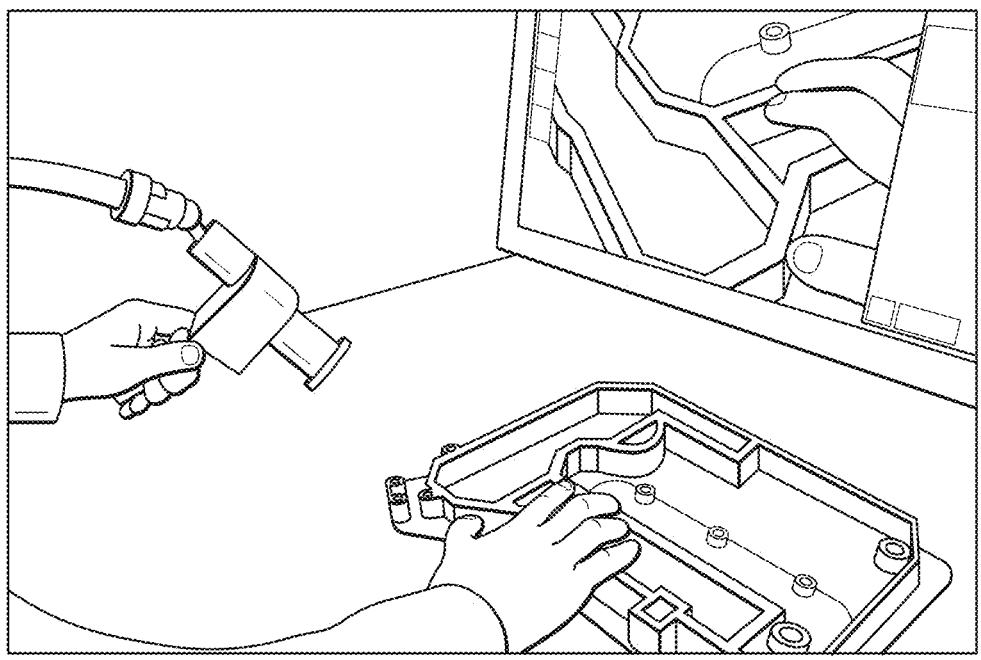
FIG. 5 illustrates a third embodiment of the surface point selection method according to the present disclosure for taking poses, applied to an automotive part.

This equipment for shooting and selecting surface points implementing the method according to the present disclosure can be implemented to process all kinds of industrial objects, for example, an automobile engine casing (FIG. 4) or an industrial part obtained by molding or injection (FIG. 5).

Figure 6:
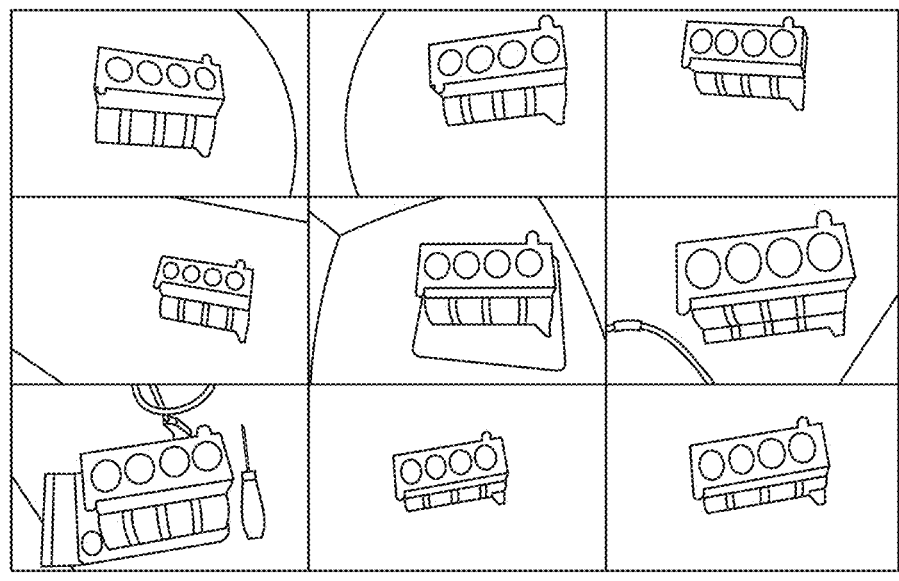
FIG. 6 illustrates a set of images of the same automotive part processed in the surface point selection method according to the present disclosure, which were taken under variable lighting, background and pose conditions.

An image partitioning technique implemented in the selection method according to the present disclosure is described below. These images may have been taken under varying lighting, background, or pose conditions, as shown in FIG. 6.

The partitioning technique comprises the following steps:

annotating images for each learning video sequence by launching 3D tracking, performing image poses, associating the closest reference viewpoint with each image based on visibility tests and 2D projections of the edgelets, identifying, in the same way, p reference images associated with the p nearest reference viewpoints, and associating, with each image, the most similar reference image based on visibility tests and 2D projections of the edgelets, as shown in FIG. 5.

Figure 7:
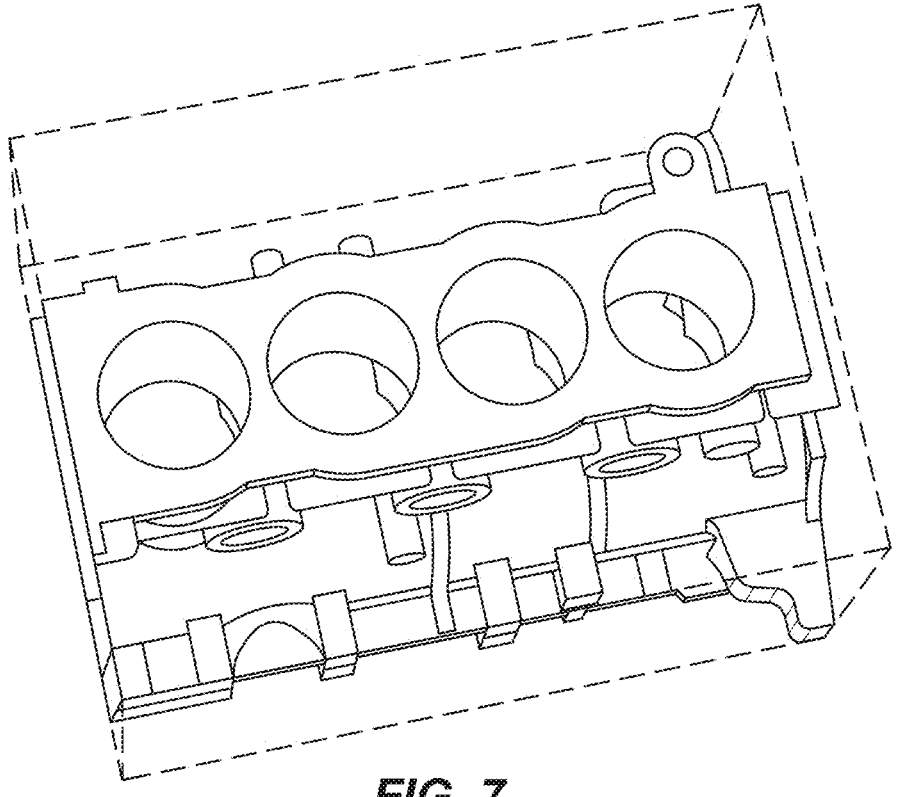
FIG. 7 illustrates a set of automatically selected edgelets in the form of surface points on the straight edges of the object, after the clustering step in the surface point selection method according to the present disclosure.

To select the surface points, the following is done for each partition:

calculating a score for each edgelet based on the number of occurrences as being "inlier" (matching edgelet-contour) from a refined camera pose for each image, projecting and clustering the edgelets having a score higher than the threshold in the p reference images to ensure a good spatial distribution and to keep only n edgelet partitions, selecting the n edgelets having the best score for each of the p distributions; as shown in FIG. 7.

Thus, n edgelets are obtained selected for each partition.

By way of non-limiting example, this score can simply be calculated as being the number of occurrences. If sequences taken in different environments (light or positioning) are available, it is possible to multiply the sum of the occurrences in each of the sequences.

A description will now be given of an embodiment of learning of a convolutional neural network implemented in the selection method according to the present disclosure.

Training Data Preparation

A partition is first associated with each image in order to teach a multi-class detector, during which step:

a class is assigned to each image, and the object face detection problem is treated as a multi-class detection problem.

For each partition, the n selected edgelets are projected and images of heat maps are generated.

Learning

A multi-class detector is taught, allowing detection of the industrial object and prediction of its distribution. For each distribution, teach a KPD based on the location of heat maps.

Figure 8:
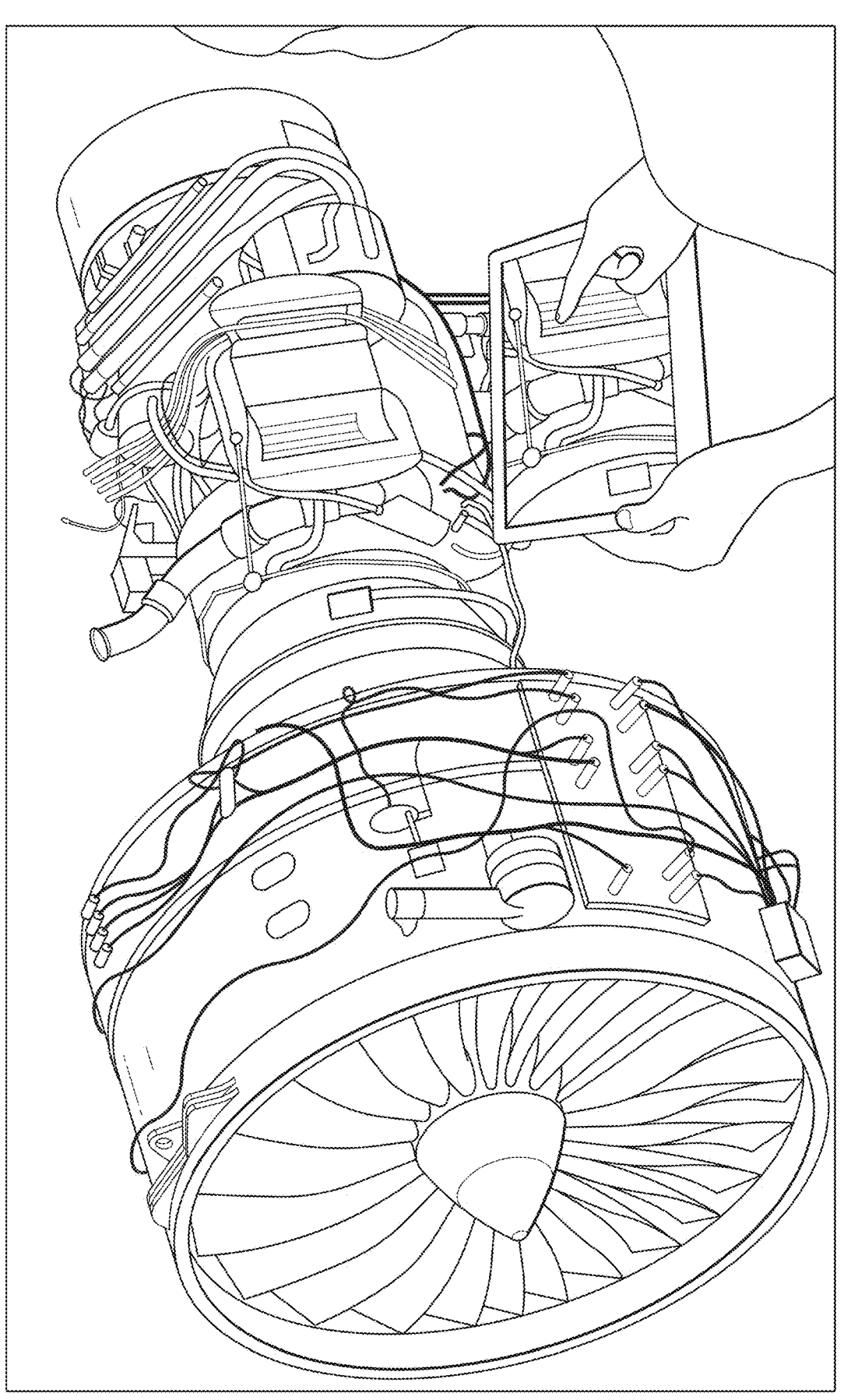
FIG. 8 illustrates an example use of augmented reality equipment implementing 3D location implementing the surface point selection method according to the present disclosure.

The selection method according to the present disclosure can be applied in the field of digital assistance, the execution of virtual production instruction sheets, assembly traceability, information statements and conformity checks, and especially in the field of augmented reality as shown in FIG. 8. Owing to a relevant selection of surface points of a complex industrial system such as an aircraft engine, the precise location of 3D objects is made possible, which provides great usage comfort and high precision in the information displayed for a maintenance operator having to intervene on these complex objects.

Of course, the present disclosure is not limited to the embodiment that has just been described, and many other embodiments can be envisaged without departing from the scope of the present disclosure.

The invention claimed is:

1. A method for automatically selecting 3D points from a CAD model, for 3D locating of an industrial object, the method comprising the following steps:

generating a geometric model from the CAD model, comprising a sampling of a set of 3D points extracted from straight edges of the CAD model, so as to generate 3D surface points;

previously designating reference viewpoints from a priori knowledge of the current viewpoints of a camera;

acquiring, by way of a camera, a plurality of images taken from viewpoints of interest of the object;

associating each acquired image with a reference viewpoint in order to form partitions comprising sub-sets of images and identifying a reference image for each partition; and selecting a number n>1 of 3D surface points for each partition, comprising the following steps:

refining the camera poses using the geometric model and identifying the associations of 3D surface points with 2D contour points that correspond to the refined poses;

calculating a score for each 3D surface point based on the number of times that 3D surface point is a match contour point;

projecting and clustering 3D surface points in each reference image; and selecting the n 3D surface points having the best score for each of the partitions.

2. The method of claim 1, wherein the method is implemented in a convolutional neural network-based six-degree-of-freedom location, the method further comprising the steps of:

training a first convolutional neural network to recognize a viewpoint of interest of the object among a set of reference viewpoints; and for each partition, learning heat maps corresponding to the 2D projections of the selected 3D surface points.

3. The method of claim 2, further comprising a step for identifying, by way of the first convolutional neural network, the closest viewpoint among six predefined viewpoints calculated automatically according to a 3D bounding box of the 3D object and camera calibration settings.

4. The method of claim 3, further comprising performing a partitioning sequence comprising the following steps:

annotating images for each learning sequence by launching 3D tracking;

associating the nearest reference viewpoint with each image based on 2D projections of 3D surface points and/or visibility tests; and identifying a number p>1 of reference images acquired from the viewpoint closest to a same number p of reference viewpoints, thus producing a same number p of partitions of the acquired images.

5. The method of claim 4, further comprising a step of associating a partition with each image for the purpose of teaching a multi-class detector.

6. The method of claim 2, further comprising performing a learning sequence during which:

a multi-class detector is taught, allowing detection of the industrial object and prediction of its distribution; and for each distribution, a keypoint detector is trained based on the location of heat maps.

7. The method of claim 1, further comprising generating a geometric model of an industrial 3D object offline, and then locating the industrial 3D object, locating the industrial 3D object comprising the following steps:

validating and refining a pose using the geometric model, this step being subject to prior initialization;

generating a 3D location of the industrial 3D object; and constructing an appearance model of the industrial 3D object.

8. The method of claim 7, further comprising the following steps carried out online:

constructing an appearance model from the pose thus refined;

extracting features in the following frames and matching with the appearance model;

estimating a pose for the 3D object; and determining a confidence score for the estimated pose.

9. The method of claim 8, wherein the pose estimation step is followed by a step that is conditioned by the level of the confidence score in the following way:

for a confidence score lower than a first predetermined threshold value, performing a 3D relocation based on a set of appearance models already produced;

for a confidence score between the first threshold value and a predetermined value, refining, then validating the pose using the geometric model;

for a confidence score greater than the second predetermined value, confirming the 3D location.

10. The method of claim 9, wherein the success or failure of the 3D relocation step leads respectively either to a new construction of an appearance model and a 3D location of the object, or to a reinitialization of the pose validation and refinement step.

11. The method of claim 10, wherein the initialization or reinitialization step prior to the execution of the pose validation and refinement step implements an initialization module based on a convolutional neural network architecture.

12. An augmented reality system exploiting 3D objects located by implementing the surface point selection method according to claim 1.

\* \* \* \* \*